United States Patent
Sugahara (10) Patent No.: US 10,870,547 B2
(45) Date of Patent: Dec. 22, 2020

(54) AIR-BLOWING METHOD AND MACHINING SYSTEM

(71) Applicant: Fanuc Corporation, Yamanashi (JP)

(72) Inventor: Hirofumi Sugahara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 26 days.

(21) Appl. No.: 16/509,764

(22) Filed: Jul. 12, 2019

(65) Prior Publication Data

US 2020/0024088 A1 Jan. 23, 2020

(30) Foreign Application Priority Data

Jul. 20, 2018 (JP) .................................. 2018-136651

(51) Int. Cl.
*B65G 69/20* (2006.01)
*B65G 47/90* (2006.01)

(52) U.S. Cl.
CPC ........... *B65G 69/20* (2013.01); *B65G 47/905* (2013.01)

(58) Field of Classification Search
CPC combination set(s) only.
See application file for complete search history.

(56) References Cited

U.S. PATENT DOCUMENTS 6,150,627 A * 11/2000 Sugiyama .............. B23H 11/00 219/69.16
2015/0290766 A1 * 10/2015 Sugiyama ............. B24B 53/007 451/444

FOREIGN PATENT DOCUMENTS

| JP | H06-052179 A | 2/1994 |
|----|--------------|--------|
| JP | H07-132463 A | 5/1995 |
| JP | H08-267328 A | 10/1996 |
| JP | H10-296546 A | 11/1998 |
| JP | 2000-135652 A | 5/2000 |
| JP | 2004-057862 A | 2/2004 |
| JP | 2010-176503 A | 8/2010 |
| JP | 2012-024851 A | 2/2012 |
| JP | 2015-199181 A | 11/2015 |

OTHER PUBLICATIONS

Kameda, Takashi; Notice of Reasons for Refusal; Japanese Patent Application No. 2018-136651; dated May 12, 2020; 2 pages.

* cited by examiner

*Primary Examiner* — Kyle O Logan
(74) *Attorney, Agent, or Firm* — Shackelford, Bowen, McKinley & Norton, LLP

(57) ABSTRACT

An air-blowing method includes the steps of blowing, inside a machine tool, air onto a workpiece after machining, issuing a workpiece pick-up advance notice signal for notifying beforehand of pick-up of the workpiece by a robot or a worker, on the basis of a task state of the robot or an operation of the worker, and calculating the additional time for air blow on the basis of a time required by the robot or the worker to arrive at a workpiece pick-up position in front of the machine tool after the workpiece pick-up advance notice signal is issued, where air blow is extended by just the additional time in the step of blowing air.

7 Claims, 5 Drawing Sheets

AIR-BLOWING METHOD AND MACHINING SYSTEM

CROSS-REFERENCE TO RELATED APPLICATIONS

This application claims the benefit of Japanese Patent Application No. 2018-136651, the content of which is incorporated herein by reference.

TECHNICAL FIELD

The present invention relates to an air-blowing method and a machining system.

BACKGROUND ART

After a workpiece is machined by a machine tool, air is blown onto the workpiece to remove chips or a cutting fluid attached to the workpiece (for example, see PTLs 1 to 4).

CITATION LIST

Patent Literature

{PTL 1}
Japanese Unexamined Patent Application, Publication No. 2004-057862
{PTL 2}
Japanese Unexamined Patent Application, Publication No. 2000-135652
{PTL 3}
Japanese Unexamined Patent Application, Publication No. Hei 07-132463
{PTL 4}
Japanese Unexamined Patent Application, Publication No. Hei 08-267328

SUMMARY OF INVENTION

An aspect of the present invention is an air-blowing method including the steps of: blowing, inside a machine tool, air onto a workpiece after machining; issuing a workpiece pick-up advance notice signal for notifying beforehand of pick-up of the workpiece by a robot or a worker, on a basis of a task state of the robot or an operation of the worker; and calculating an additional time for air blow on a basis of a time required by the robot or the worker to arrive at a workpiece pick-up position in front of the machine tool after the workpiece pick-up advance notice signal is issued, where air blow is extended by just the additional time in the step of blowing air.

Another aspect of the present invention is a machining system including: a machine tool that machines and blows air onto a workpiece; a pick-up advance notice signal issuing unit that issues a workpiece pick-up advance notice signal for notifying beforehand of pick-up of the workpiece by a robot or a worker, on a basis of a task state of the robot or an operation of the worker; and an additional time calculation unit that calculates an additional time for air blow on a basis of a time required by the robot or the worker to arrive at a workpiece pick-up position in front of the machine tool after the workpiece pick-up advance notice signal is issued, where the machine tool extends air blow by just the additional time.

DESCRIPTION OF EMBODIMENTS

Hereinafter, a machining system 100 according to an embodiment of the present invention will be described with reference to the drawings.

Figure 1:
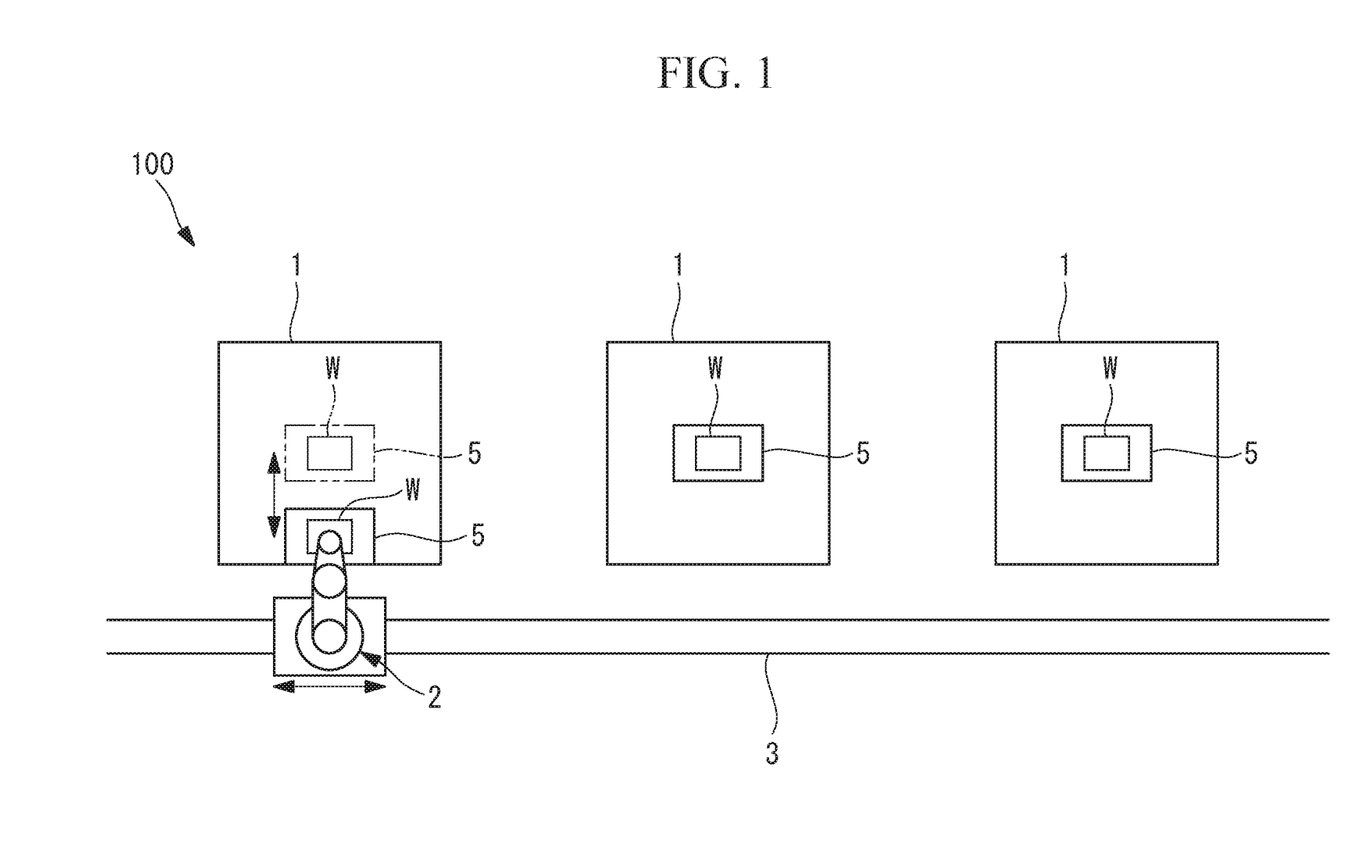
FIG. 1 is a schematic plan view showing an overall configuration of a machining system according to an embodiment of the present invention.

As shown in FIG. 1, the machining system 100 according to the present embodiment includes a plurality of machine tools 1 and a robot 2. The plurality of machine tools 1 are arranged along a rail 3. The robot 2 moves along the rail 3.

Figure 2:
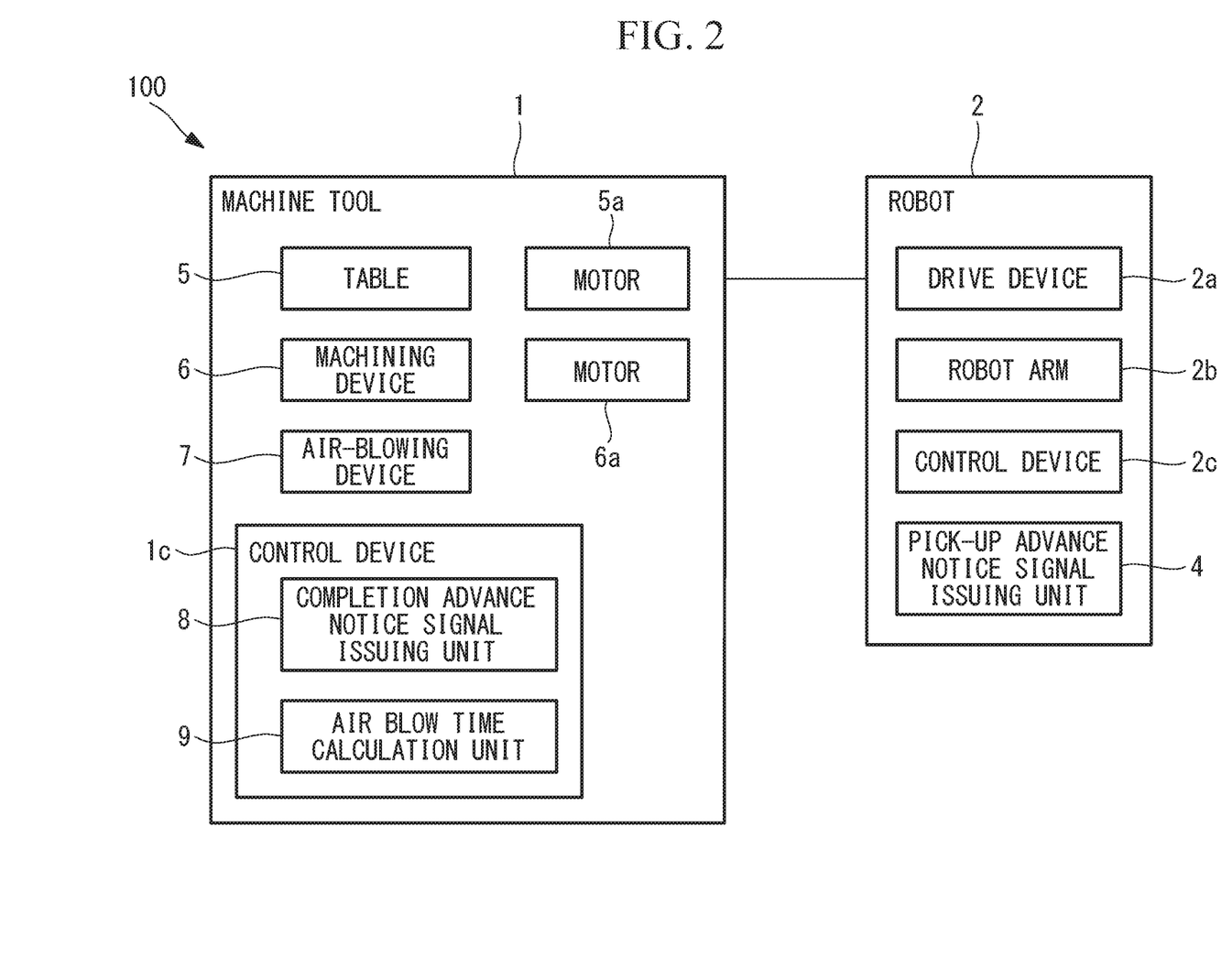
FIG. 2 is a block diagram showing a configuration of a machine tool and a robot in the machining system in FIG. 1.

The robot 2 is a robot including a hand for grasping a workpiece W, and is a 6-axis articulated robot, for example. As shown in FIG. 2, the robot 2 includes a drive device 2a for moving the robot 2 along the rail 3, a robot arm 2b with a hand attached to a tip end, and a control device 2c for controlling the drive device 2a and the robot arm 2b, for example.

The robot 2 is capable of communicating with each of the plurality of machine tools 1. In response to a workpiece request signal issued from a machine tool 1, the robot 2 supplies a workpiece W to the transmission-source machine tool 1. Furthermore, in response to a task completion advance notice signal issued from a machine tool 1, the robot 2 moves toward the transmission-source machine tool 1, and in response to a task completion signal issued from a machine tool 1, the robot 2 picks up the workpiece from the transmission-source machine tool 1.

The robot 2 includes a pick-up advance notice signal issuing unit 4 for issuing a workpiece pick-up advance notice signal for notifying beforehand of pick-up of a workpiece W. In a pick-up task for the workpiece W, the robot 2 issues the workpiece pick-up advance notice signal from the pick-up advance notice signal issuing unit 4 to the transmission-source machine tool 1, immediately before moving toward the transmission-source machine tool 1. The workpiece pick-up advance notice signal includes information regarding a moving time required by the robot 2 to arrive at a predetermined workpiece pick-up position in front of the transmission-source machine tool 1 after issuing the workpiece pick-up advance notice signal. The information regarding a moving time indicates a current position of the robot 2, for example.

As shown in FIG. 2, each machine tool 1 includes a table 5 where the workpiece W is placed, a machining device 6 for machining the workpiece W, and an air-blowing device 7 for blowing air onto the workpiece W.

Furthermore, for example, the machine tool 1 includes at least one motor 5a for driving the table 5, at least one motor 6a for driving the machining device 6 including a main spindle and the like, and a control device 1c for controlling the air-blowing device 7 and the motors 5a, 6a.

The table 5 may be moved, by the motor 5a, between a task position and a workpiece entering/leaving position. With respect to the machine tool 1 on the left in FIG. 1, the table 5 at the workpiece entering/leaving position is indicated by a solid line, and the table 5 at the task position is indicated by a dash-dot-dotted line. The workpiece entering/leaving position is a position where the robot 2 at the workpiece pick-up position is able to place the workpiece W on the table 5 and to pick up the workpiece W on the table 5.

The machining device 6 includes one or a plurality of tools such as a drill or an endmill. The machining device 6 machines the workpiece W at the task position by a tool. During machining by the machining device 6, a cutting fluid is supplied to the workpiece W.

The air-blowing device 7 blasts air toward the workpiece W at the task position (air blow position) to blow away the cutting fluid attached to the workpiece W.

Furthermore, the control device 1c of each machine tool 1 includes a completion advance notice signal issuing unit 8 for issuing, to the robot 2, a task completion advance notice signal for notifying beforehand of completion of a task, and an air blow time calculation unit (additional time calculation unit) 9 for calculating an air blow time. Functions of the completion advance notice signal issuing unit 8 and the air blow time calculation unit 9 described later are implemented by a processor provided in the control device 1c of the machine tool 1 performing processes according to predetermined programs.

After the air-blowing device 7 starts blowing air, the completion advance notice signal issuing unit 8 issues the task completion advance notice signal to the robot 2. The completion advance notice signal issuing unit 8 may alternatively issue the task completion advance notice signal before the end of machining or at the end of machining of the workpiece W by a tool, instead of after air blow is started.

When the workpiece pick-up advance notice signal is issued by the robot 2 to the machine tool 1 as a response to the task completion advance notice signal, the air blow time calculation unit 9 calculates an additional time (B−C) and further calculates an air blow time A in the manner shown by the following Equation (1)

$$A=D+(B-C) \quad (1)$$

Here, A is the air blow time from the start to the end of air blow. B is a time required by the robot 2 to arrive at the workpiece pick-up position in front of the machine tool 1 after issuing the workpiece pick-up advance notice signal. For example, the time B is calculated on the basis of a distance between the current position of the robot 2 included in the workpiece pick-up advance notice signal and the machine tool 1. C is a moving time of the table 5 from the task position to the workpiece entering/leaving position. D is a time from the start of air blow to issuance of the workpiece pick-up advance notice signal, or in other words, a time from the start of air blow to reception of the workpiece pick-up advance notice signal by the control device 1c.

The air blow time calculation unit 9 notifies the air-blowing device 7 of the calculated air blow time A. The air-blowing device 7 ends air blow when just the additional time (B−C) is passed from issuance of the workpiece pick-up advance notice signal.

Figure 3:
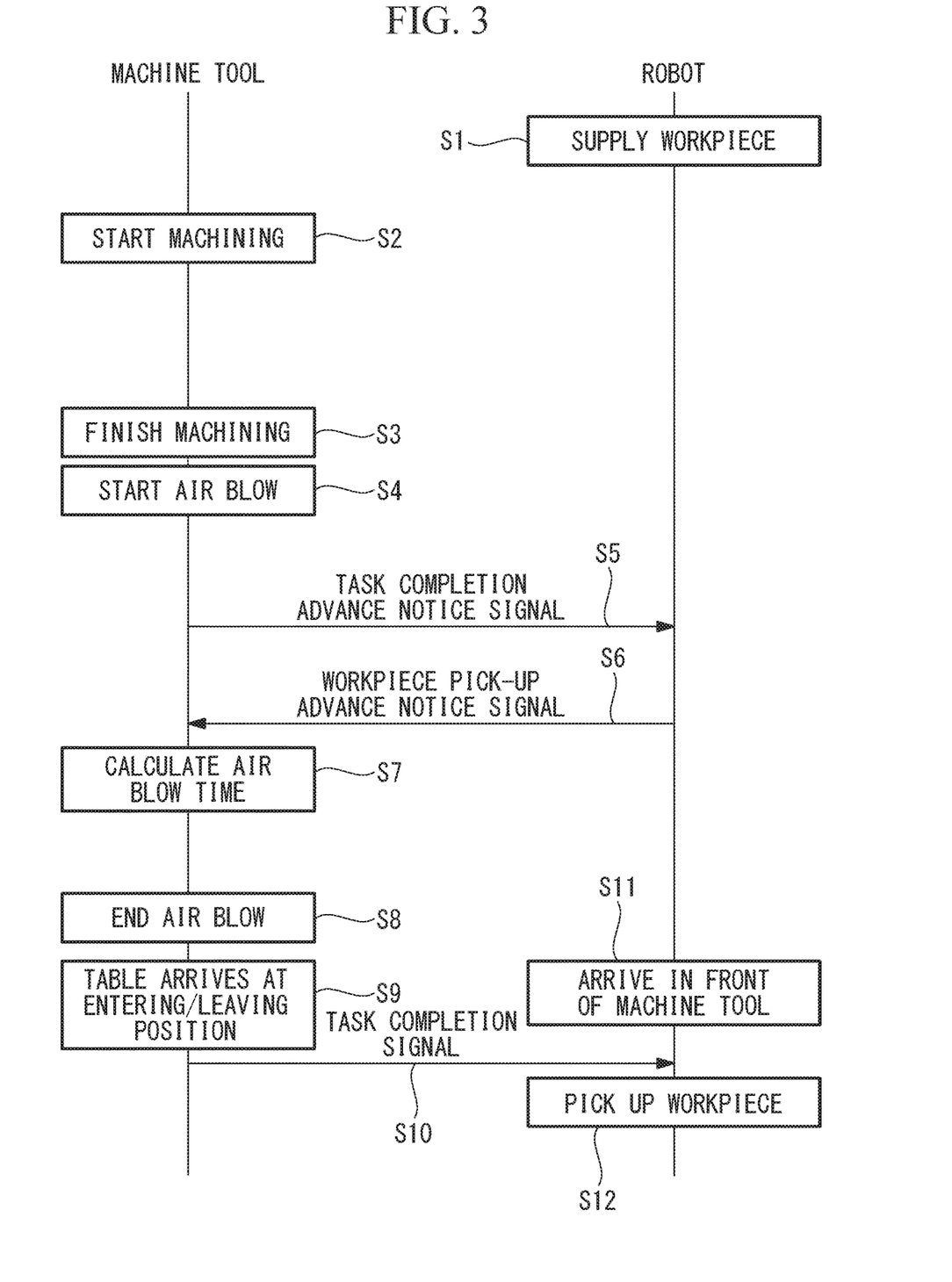
FIG. 3 is a sequence chart showing an air-blowing method of the machining system in FIG. 1.
Figure 4:
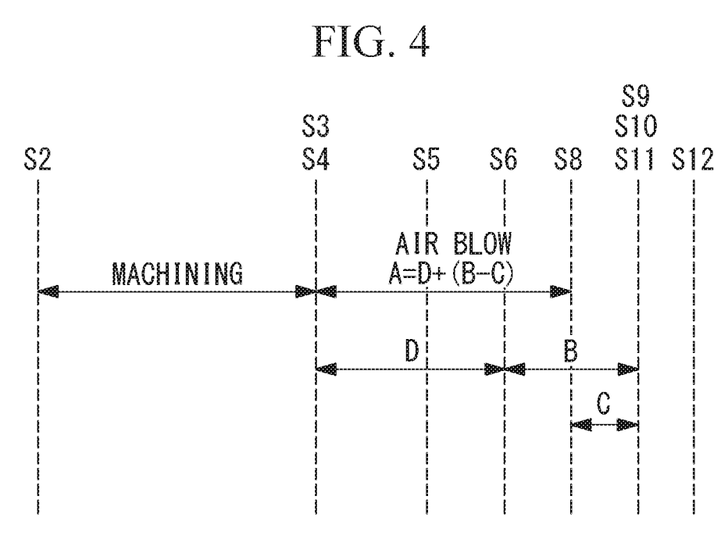
FIG. 4 is a chart showing timings of steps S2 to S12 in the air-blowing method in FIG. 3.

Next, an operation of the machining system 100 will be described with reference to FIGS. 3 and 4.

The robot 2 transports the workpiece W to the machine tool 1 in response to the workpiece request signal from the machine tool 1, and places the workpiece W on the table 5 at the workpiece entering/leaving position at the machine tool 1 (step S1).

Next, the machine tool 1 moves the table 5 from the workpiece entering/leaving position to the task position and starts machining of the workpiece W on the table 5 by the machining device 6 (step S2). When machining is finished (step S3), the machine tool 1 starts blowing air onto the workpiece W by the air-blowing device 7 (step S4). Then, the completion advance notice signal issuing unit 8 of the machine tool 1 issues the task completion advance notice signal to the robot 2 (step S5).

In response to the task completion advance notice signal from the machine tool 1, the robot 2 issues the workpiece pick-up advance notice signal to the machine tool 1 immediately before starting to move to the transmission-source machine tool 1 to pick up the workpiece W (step S6), and then, moves to in front of the machine tool 1.

When the workpiece pick-up advance notice signal is received from the robot 2, the air blow time calculation unit 9 of the machine tool 1 calculates the additional time (B−C) on the basis of the workpiece pick-up advance notice signal, and then, calculates the air blow time A (step S7). Next, the machine tool 1 extends air blow by the air-blowing device 7 by just the additional time (B−C) from when the workpiece pick-up advance notice signal is issued (step S8).

After air blow is ended, the machine tool 1 moves the table 5 and the workpiece W from the task position to the workpiece entering/leaving position (step S9), and issues the task completion signal to the robot 2 (step S10).

The additional time for air blow calculated in step S7 is a difference between the moving time B of the robot 2 to the workpiece pick-up position in front of the machine tool 1 and the moving time C of the table 5 to the workpiece entering/leaving position. Accordingly, as shown in FIG. 4, the robot 2 arrives at the workpiece pick-up position in front of the machine tool 1 (step S11) at the same time or at substantially the same time as arrival of the table 5 at the workpiece entering/leaving position (step S9).

Next, the robot 2 picks up the workpiece W on the table 5 in the machine tool 1 in response to the task completion signal (step S12).

A machining time for the workpiece W in the machine tool 1 varies among the plurality of machine tools 1. For example, in the case where the plurality of machine tools 1 are to perform same machining, the machining time becomes varied as a result of automatically adjusting machining conditions to optimal conditions for each workpiece W. In the case where the plurality of machine tools 1 are to perform different types of machining, the machining time is different depending on contents of machining. In this manner, because the machining time for the workpiece W is different for each machine tool 1, an elapsed time from end of machining by the machining device 6 in the machine tool 1 to pick-up of the workpiece W by the robot 2 is varied.

Figure 5:
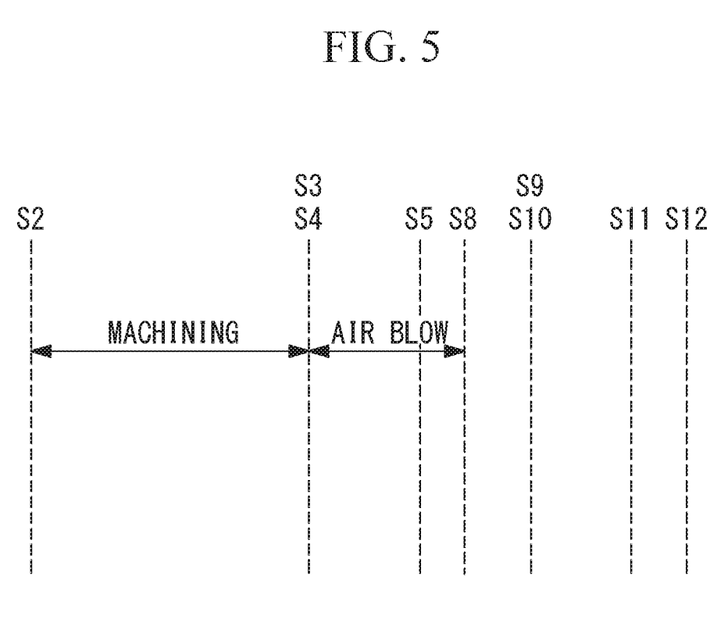
FIG. 5 is a chart showing timings of an air-blowing method according to Comparative Example.

FIG. 5 shows an air-blowing method according to Comparative Example of the present invention. As shown in FIG. 5, in the case where the air blow time A in the machine tool 1 is fixed, a time when no task is performed on the workpiece W possibly occurs between end of air blow (step S8) to arrival of the robot 2 (step S11).

According to the present embodiment, after air blow is started inside the machine tool 1, the workpiece pick-up advance notice signal is issued from the robot 2 to the machine tool 1, in response to the task completion advance notice signal from the machine tool 1 to the robot 2. Then, the additional time (B−C) for air blow is calculated on the basis of the workpiece pick-up advance notice signal, and air blow is extended by just the additional time (B−C) from when the workpiece pick-up advance notice signal is issued. The amount of cutting fluid remaining on the workpiece W may thereby be reduced as much as possible by making maximum use of the time until the robot 2 arrives at the workpiece pick-up position in front of the machine tool 1 and by blowing air onto the workpiece W for a maximum allowable duration. Furthermore, the influence of the cutting fluid on a task in a next step may thereby be reduced. For example, in a cleaning step performed next, a cleaning time of the workpiece W may be reduced, or the amount of use of cleaning fluid may be cut down.

In the present embodiment, the air blow time A may be calculated in the following manner. E is a predetermined minimum air blow time.

When E>D, A=D+(B−C).

When E≤D, A=D.

That is, in the case where the time D at a time point of issuance of the workpiece pick-up advance notice signal has not reached the minimum air blow time E, the air blow is extended by just the additional time (B−C), as described above. On the other hand, in the case where the time D at the time point of issuance of the workpiece pick-up advance notice signal already reaches the minimum air blow time E, the air blow is ended without being extended.

In this manner, air blow may be prevented from being continued longer than necessary.

Alternatively, measurement of the time D may be started at the same time as start of air blow, and air blow may be ended when the measured time D reaches a predetermined maximum air blow time F, regardless of whether the workpiece pick-up advance notice signal is issued or not.

In the present embodiment, the air blow time calculation unit 9 of the control device 1*c* calculates the moving time B of the robot 2 from the current position of the robot 2, and then, further calculates the additional time (B−C), but instead, the additional time may be calculated on the basis of a correspondence table that is registered in advance, when the workpiece pick-up advance notice signal is received.

The correspondence table associates the current position of the robot 2 and the additional time for air blow. The additional time is set longer, the further away the current position of the robot 2 is from the machine tool 1. The air blow time calculation unit 9 reads, from the correspondence table, the additional time that is associated with the current position of the robot 2. The control device 1*c* receives information regarding the current position of the robot 2 from the control device 2*c* or another control device.

The air blow time calculation unit 9 may create the correspondence table by measuring the moving time B from issuance of the workpiece pick-up advance notice signal to arrival of the robot 2 at the workpiece pick-up position, and by storing the additional time (B−C) in association with the position of the robot 2 at the time point of issuance of the workpiece pick-up advance notice signal.

Figure 6:
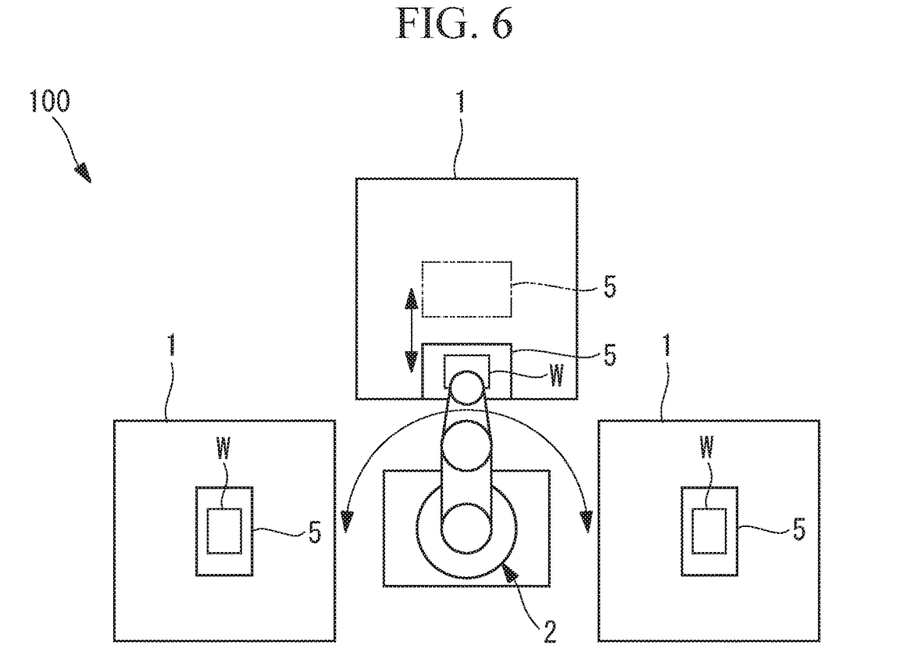
FIG. 6 is a schematic plan view showing an overall configuration of a modification of the machining system in FIG. 1.

In the present embodiment, the robot 2 moves along the rail 3, but instead, the plurality of machine tools 1 may be arranged around the robot 2 which is capable of swiveling in a horizontal direction, as shown in FIG. 6.

Figure 7:
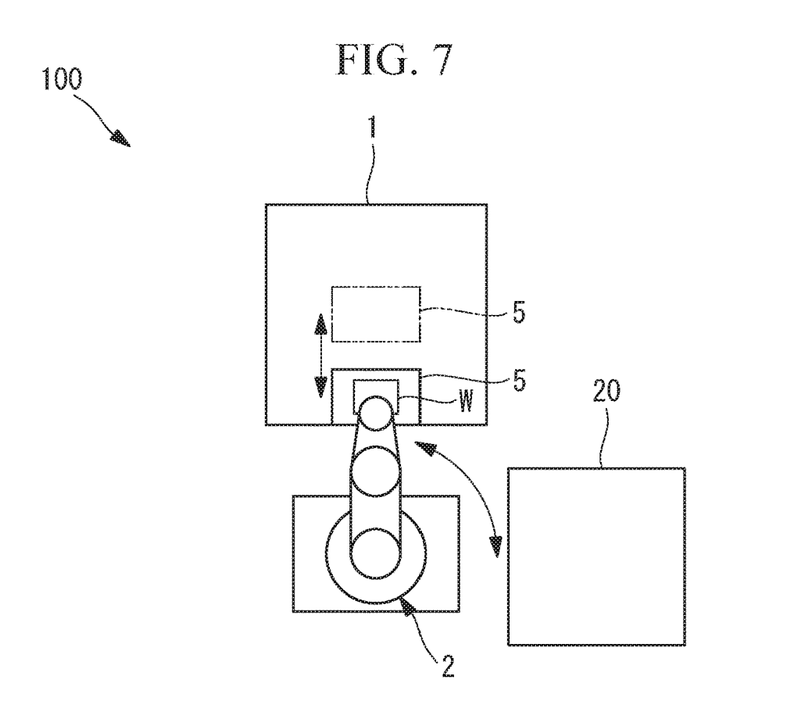
FIG. 7 is a schematic plan view showing an overall configuration of another modification of the machining system in FIG. 1.

Alternatively, as shown in FIG. 7, one machine tool 1 and another device 20 may be arranged around the robot 2. The other device 20 is a device for treating the workpiece W before or after machining by the machine tool 1, and is a deburring device or a cleaning device, for example. The robot 2 conveys the workpiece W between the machine tool 1 and the other device 20.

In the present embodiment, the workpiece pick-up advance notice signal is issued from the robot 2 to the machine tool 1, but instead, the workpiece pick-up advance notice signal may be issued to the machine tool 1 from a device other than the robot 2.

A timing when the robot 2 starts to move toward the machine tool 1 to pick up the workpiece W is grasped by the control device 2*c* controlling the robot 2. Accordingly, the pick-up advance notice signal issuing unit 4 provided in the control device 2*c* of the robot 2 may issue the workpiece pick-up advance notice signal on the basis of a task state of the robot 2. For example, the control device 2*c* is a programmable logic controller (PLC) or a programmable machine controller (PMC). The pick-up advance notice signal issuing unit 4 may be provided in a cell control device that manages and controls the entire machining system 100. The cell control device may be connected to the plurality of machine tools 1 and the robot 2 over the Internet.

Alternatively, the plurality of machine tools 1 may each include the pick-up advance notice signal issuing unit 4, and may be able to communicate with each other. In this case, for example, one machine tool 1 to which the workpiece W is supplied or from which the workpiece W is picked up by the robot 2 issues the workpiece pick-up advance notice signal to another machine tool 1 from which the workpiece W is to be picked up by the robot 2 immediately afterwards.

In the present embodiment, each machine tool 1 calculates the additional time for air blow, but instead, the additional time for air blow may be calculated by another device. For example, the additional time for air blow may be calculated by the robot 2 or any of the control devices described above. In this case, the workpiece pick-up advance notice signal is issued to the device which is to perform calculation of the additional time for air blow.

The control device may perform both issuance of the workpiece pick-up advance notice signal and calculation of the additional time for air blow.

In the present embodiment, the moving time B until the robot 2 arrives at the workpiece pick-up position in front of the machine tool 1 is calculated on the basis of the position of the robot 2 at the time of issuance of the workpiece pick-up advance notice signal, but the moving time B may alternatively be calculated on the basis of another piece of information.

For example, the moving time B may be calculated on the basis of a motion of the robot 2 at the time of issuance of the workpiece pick-up advance notice signal. The control device 2*c* controlling the robot 2 may calculate a remaining time of a task that is being performed by the robot 2 from a current motion of the robot 2, by a control program for the robot 2, and may further calculate the moving time B. In this case, the timing of issuance of the workpiece pick-up advance notice signal does not have to be immediately before start of movement to the machine tool 1 for pick-up of the workpiece.

As shown in FIG. 5 or FIG. 6, in the case where the robot 2 swivels, the moving time B may be calculated on the basis of a current posture of the robot around a swivel axis.

In the present embodiment, the robot 2 picks up the workpiece W from the machine tool 1, but instead, a worker may pick up the workpiece W from the machine tool 1.

In this case, the pick-up advance notice signal issuing unit 4 issues the workpiece pick-up advance notice signal on the basis of an operation by the worker. For example, the pick-up advance notice signal issuing unit 4 is a button installed in a periphery of the machine tool 1. Before starting to move to the machine tool 1 to pick up the workpiece W, the worker operates the pick-up advance notice signal issuing unit 4 to issue the workpiece pick-up advance notice signal.

From the above-described embodiment, the following invention is derived.

An aspect of the present invention is an air-blowing method including the steps of: blowing, inside a machine tool, air onto a workpiece after machining; issuing a workpiece pick-up advance notice signal for notifying beforehand of pick-up of the workpiece by a robot or a worker, on a basis of a task state of the robot or an operation of the worker; and calculating an additional time for air blow on a basis of a time required by the robot or the worker to arrive at a workpiece pick-up position in front of the machine tool after the workpiece pick-up advance notice signal is issued, where air blow is extended by just the additional time in the step of blowing air.

After the workpiece is machined and air is blown onto the workpiece inside the machine tool, the workpiece is picked up from the machine tool by the robot or the worker.

Before pick-up of the workpiece, the workpiece pick-up advance notice signal is issued, and the additional time for air blow is calculated on the basis of the time required by the robot or the worker to arrive in front of the machine tool after the workpiece pick-up advance notice signal is issued. Then, the air blow is extended by just the additional time. Air may thus be blown onto the workpiece for a maximum allowable duration until the robot or the worker arrives, and the amount of cutting fluid remaining on the workpiece may be reduced as much as possible.

In the aspect described above, there may further be included the step, performed after the step of blowing air, of moving the workpiece inside the machine tool, from an air blow position to a workpiece entering/leaving position, where in the step of calculating the additional time for air blow, the additional time for air blow may be calculated on a basis also of a moving time of the workpiece from the air blow position to the workpiece entering/leaving position.

According to such a configuration, the additional time for air blow may be calculated taking into account the moving time of the workpiece after air blow.

In the aspect described above, an air blow time from start to end of air blow may be calculated by $A=D+(B-C)$, where A is the air blow time, B is the time required by the robot or the worker to arrive at the workpiece pick-up position in front of the machine tool after the workpiece pick-up advance notice signal is issued, C is the moving time of the workpiece from the air blow position to the workpiece entering/leaving position, and D is a time from the start of air blow to issuance of the workpiece pick-up advance notice signal.

According to such a configuration, the additional time is calculated by $(B-C)$. The time until arrival of the robot or the worker may thereby be used as much as possible for air blow.

In the aspect described above, when a predetermined minimum air blow time is given as E, $A=D+(B-C)$ may be true in a case of $E>D$, and $A=D$ may be true in a case of $E \leq D$.

According to such a configuration, in the case where the air blow time at a time point of issuance of the workpiece pick-up advance notice signal has not reached the minimum air blow time, the air blow is extended by just the additional time $(B-C)$. On the other hand, in the case where the air blow time at the time point of issuance of the workpiece pick-up advance notice signal already reaches the minimum air blow time, the air blow is ended without being extended. Air blow may thereby be prevented from being continued longer than necessary.

In the aspect described above, in the step of issuing the workpiece pick-up advance notice signal, the robot or a control device that controls the robot may issue the workpiece pick-up advance notice signal to the machine tool.

According to such a configuration, the workpiece pick-up advance notice signal may be issued at an optimal timing according to a state of progress of a task of the robot.

In the aspect described above, there may further be included the step of issuing, by the machine tool, a task completion advance notice signal to the robot, after air blow is started, where in the step of issuing the workpiece pick-up advance notice signal, the robot may issue the workpiece pick-up advance notice signal to the machine tool in response to the task completion advance notice signal.

According to such a configuration, the robot is notified by the task completion advance notice signal of a task inside the machine tool nearing completion. The robot issues the workpiece pick-up advance notice signal in response to the task completion advance notice signal, and then, moves to the machine tool to pick up the workpiece. In this manner, a timing of picking up the workpiece may be optimized with respect to a state of progress of a task of the machine tool.

Another aspect of the present invention is a machining system including: a machine tool that machines and blows air onto a workpiece; a pick-up advance notice signal issuing unit that issues a workpiece pick-up advance notice signal for notifying beforehand of pick-up of the workpiece by a robot or a worker, on a basis of a task state of the robot or an operation of the worker; and an additional time calculation unit that calculates an additional time for air blow on a basis of a time required by the robot or the worker to arrive at a workpiece pick-up position in front of the machine tool after the workpiece pick-up advance notice signal is issued, where the machine tool extends air blow by just the additional time.

REFERENCE SIGNS LIST 1 machine tool
2 robot
3 rail
4 pick-up advance notice signal issuing unit
5 table
6 machining device
7 air-blowing device
8 completion advance notice signal issuing unit
9 air blow time calculation unit (additional time calculation unit)
100 machining system
W workpiece

The invention claimed is:
1. An air-blowing method comprising the steps of:
blowing, inside a machine tool, air onto a workpiece after machining;
issuing a workpiece pick-up advance notice signal for notifying beforehand of pick-up of the workpiece by a robot or a worker to the machine tool or another device, on a basis of a task state of the robot or an operation of the worker; and
calculating an additional time for air blow by the machine tool or the another device, on a basis of a time required by the robot or the worker to arrive at a workpiece pick-up position in front of the machine tool after the workpiece pick-up advance notice signal is issued, wherein air blow is extended by just the additional time in the step of blowing air.

2. The air-blowing method according to claim 1, further comprising the step, performed after the step of blowing air, of moving the workpiece inside the machine tool, from an air blow position to a workpiece entering/leaving position, wherein in the step of calculating the additional time for air blow, the additional time for air blow is calculated on a basis also of a moving time of the workpiece from the air blow position to the workpiece entering/leaving position.

3. The air-blowing method according to claim 2, wherein an air blow time from start to end of air blow is calculated by:

$$A = D + (B - C),$$

where A is the air blow time,

B is the time required by the robot or the worker to arrive at the workpiece pick-up position in front of the machine tool after the workpiece pick-up advance notice signal is issued, C is the moving time of the workpiece from the air blow position to the workpiece entering/leaving position, and D is a time from the start of air blow to issuance of the workpiece pick-up advance notice signal.

4. The air-blowing method according to claim 3, wherein, when a predetermined minimum air blow time is given as E, $A = D + (B - C)$ is true in a case of $E > D$, and $A = D$ is true in a case of $E < D$.

5. The air-blowing method according to claim 1, wherein, in the step of issuing the workpiece pick-up advance notice signal, the robot or a control device that controls the robot issues the workpiece pick-up advance notice signal to the machine tool.

6. The air-blowing method according to claim 5, further comprising the step of issuing, by the machine tool, a task completion advance notice signal to the robot, after air blow is started, wherein in the step of issuing the workpiece pick-up advance notice signal, the robot issues the workpiece pick-up advance notice signal to the machine tool in response to the task completion advance notice signal.

7. A machining system comprising:

a machine tool that machines and blows air onto a workpiece;

a pick-up advance notice signal issuing unit that issues a workpiece pick-up advance notice signal for notifying beforehand of pick-up of the workpiece by a robot or a worker to the machine tool or another device, on a basis of a task state of the robot or an operation of the worker; and an additional time calculation unit provided in the machine tool or the another device and that calculates an additional time for air blow on a basis of a time required by the robot or the worker to arrive at a workpiece pick-up position in front of the machine tool after the workpiece pick-up advance notice signal is issued, wherein the machine tool extends air blow by just the additional time.

* * * * *